A. W. LIVINGSTON.
VEHICLE TIRE.
APPLICATION FILED FEB. 10, 1913. RENEWED DEC. 14, 1914.

1,129,807.

Patented Feb. 23, 1915.

3 SHEETS—SHEET 1.

Witnesses

Inventor
Andrew W. Livingston
By Harry C. Schroeder
Attorney

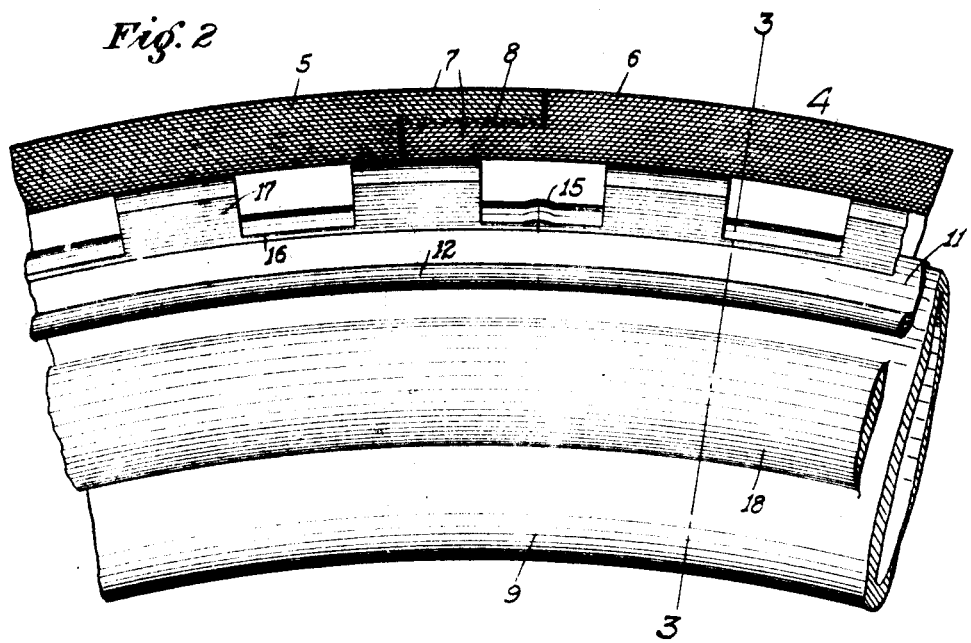
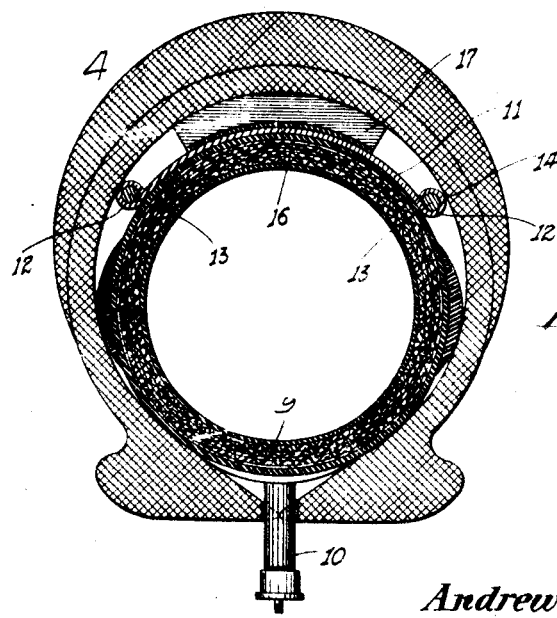

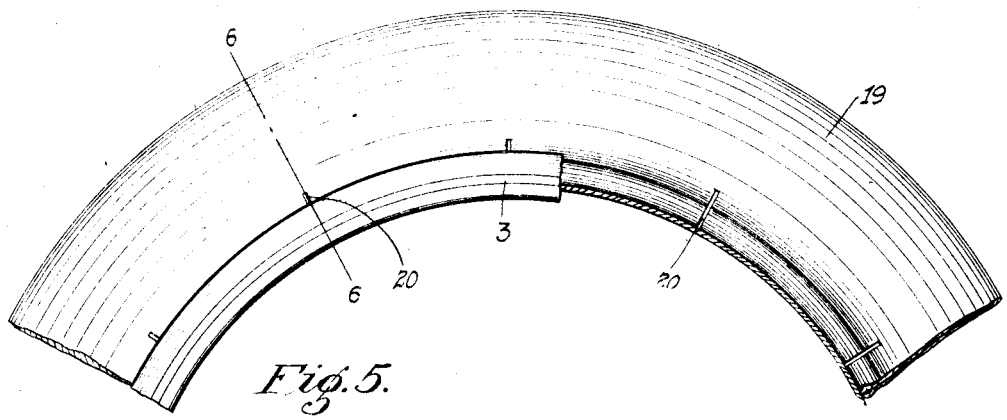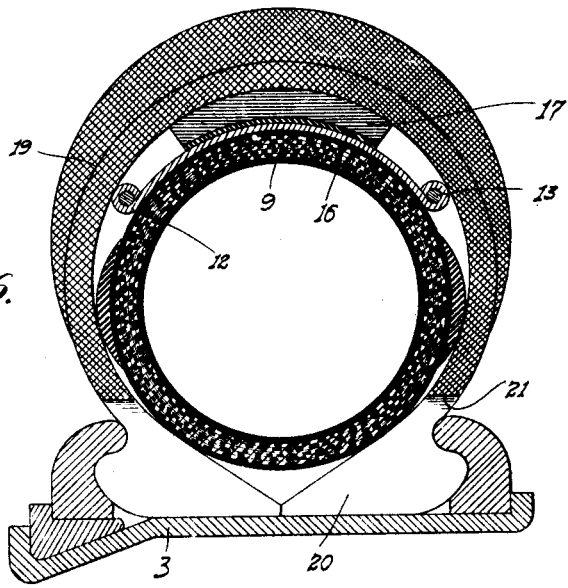

UNITED STATES PATENT OFFICE.

ANDREW WILLIAM LIVINGSTON, OF OAKLAND, CALIFORNIA.

VEHICLE-TIRE.

1,129,807.  Specification of Letters Patent.  Patented Feb. 23, 1915.

Application filed February 10, 1913, Serial No. 747,341. Renewed December 14, 1914. Serial No. 877,268.

*To all whom it may concern:*

Be it known that I, ANDREW WILLIAM LIVINGSTON, a citizen of the United States, residing at Oakland, in the county of Alameda and State of California, have invented certain new and useful Improvements in Vehicle-Tires, of which the following is a specification.

Figure 1:
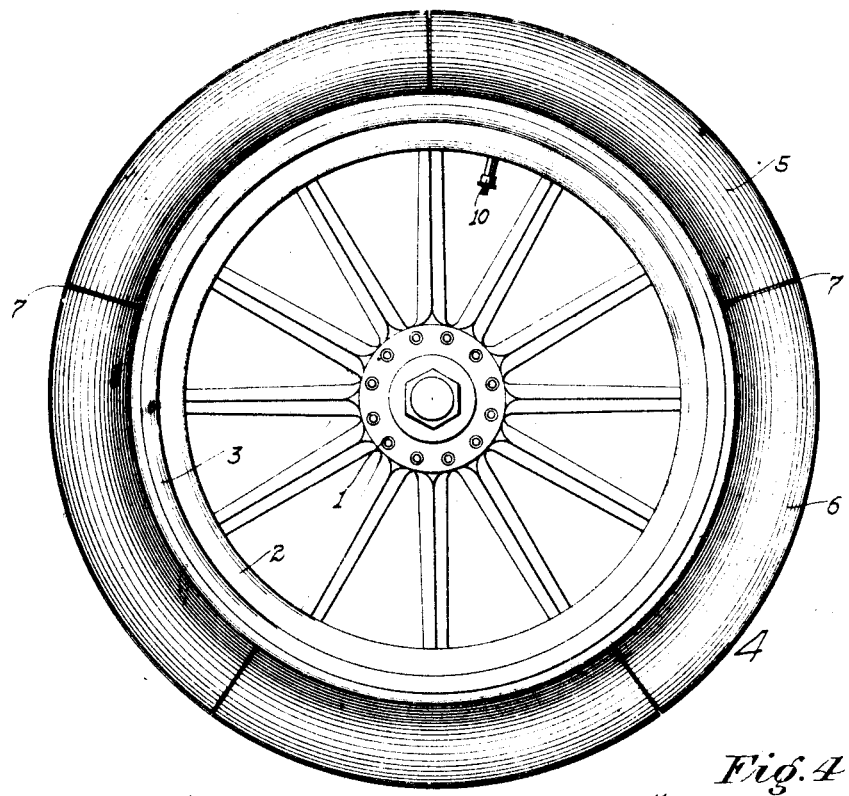
Figure 4:
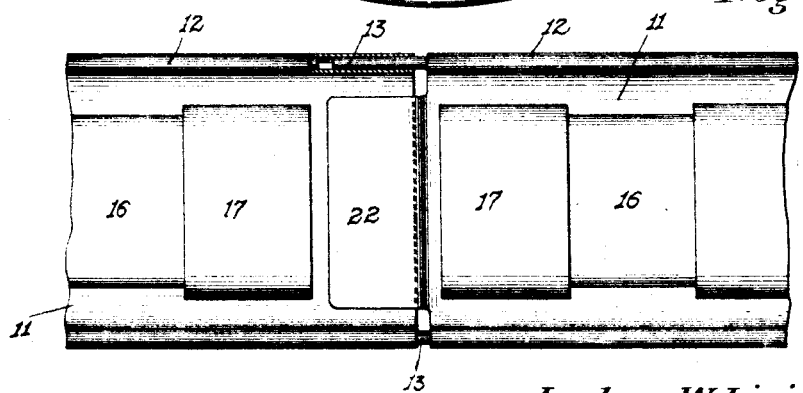

This invention relates to tires, and particularly to pneumatic tires for automobiles, the object of the invention being to provide a ventilated tire for the purpose of doing away with the ruinous heat of compression and yet one which will be fully resilient and practically puncture proof and capable of severe usage and great mileage at a minimum of initial cost and upkeep expense. This object I accomplish by means of the structure described in this specification and shown in the accompanying drawings, in which:

Figure 1 is a side view of standard automobile wheel, showing my improved tire as it would appear installed thereon. Fig. 2 is an enlarged longitudinal view of a fragment of the tire with the outer casing in section. Fig. 3 is a view relatively on a line 3—3 of Fig. 2. Fig. 4 is a top plan fragmentary view of a protective armor showing the two ends lapped. Fig. 5 is a fragmentary view of a wheel showing a modified form of tire thereon. Fig. 6 is a section on line 6—6 of Fig. 5.

Describing now the various features shown in the above figures, in which corresponding numbers indicate the same parts in the several views: 1 is an automobile wheel having the usual felly 2 on which is mounted the detachable rim 3. On this rim 3 is mounted an outer casing of any ordinary type 4 composed of a plurality of segments as 5—6. At the point of conjunction of any two of these segments, they are preferably cut to overlap each other as at 7, the overlapping surfaces being notched at as 8 so as to form a close but not air tight joint, and at the same time preventing any foreign material from getting down inside the casing. Should it be desired, however, these segments 5—6 may simply be butt joints, which may be welded together with soft rubber, enough of the joint being left unwelded on the sides of the casing to permit of the desired ingress and free circulation of air. Inside casing 4, and of a smaller diameter than the inside thereof, is an inner pneumatic tube 9, this being preferably of considerably heavier material than the usual inner tubes are composed of and capable of sustaining pressure by itself, and provided with a valve 10 extending through the rim 3. Mounted on said tube 9 and curved to conform to the perimeter and circumference thereof is a thin steel protector or plate 11 turned up along its edges to form eyes 12, reinforcing members of steel wire 13 fitting in said eyes and running the entire length thereof, the curvature of the member 11 being such that the eyes 12 will just touch the inner surface of the casing 4, as at 14, the two ends of this steel protector being preferably welded as at 15, thus forming a continuous band of steel. Vulcanized onto the protector 11 and extending the length thereof is a layer of rubber 16 onto which are secured blocks of hard rubber 17 spaced at suitable intervals which on top are curved to conform to the inner surface of casing 4, against which they impinge. On either side of the inner tube 9 are rounded ribs or reinforcements of rubber 18 against which casing 4 also impinges, thus preventing any tendency of the casing 4 to sag inward at that point and thereby crack the same and further making the inner tube 9 safe from puncture at its only vulnerable points.

Referring now to Figs. 5 and 6, should it be desired to use one entire outer casing instead of the sections as heretofore described and shown in Fig. 1, the casing 19 is cut across its entire under side as at 20 at a plurality of points, said cuts extending slightly above the top of the line of the rim or tire irons as at 21. These cuts are made with a saw or similar means, so that while admitting of a circulation of air are not wide enough to weaken the casing, or permit foreign matter to lodge therein. These cuts or slits also make it easier to put on the rim as the resisting tendency of the thick beads of the casing is considerably lessened thereby.

It will be seen from the foregoing description of the structure embodied in my invention that there is an air space all around said inner tube which is normally full of uncompressed air this air, on account of its not being confined in an air tight chamber, is capable of renewal at any time and automatically when the vehicle on which the tire is used is in motion, as any weight on or movement of the wheel creates a tendency to compress the air in said air space, which can readily find an exit through the joining of the casings 4—5—6, at the same time admitting a fresh supply when the pressure is changed or removed, thus maintaining a constant supply of fresh cool air in said air space and around said inner tube, and so preventing said inner tube from becoming overheated as is frequently the case at present, resulting in a rapid deterioration of both casing and inner tube.

Should it be desired, instead of being welded, one end of said protector may overlap the other as at 22 in Fig. 4, the turned up edges 12 of the overlapping member being cut off at a point slightly greater than the length overlapped. The end of wires 13 thus protruding being forced into the corresponding member 12 of the other end of member 11, as shown in Fig. 4. The overlapping portion or tongue 22 being turned slightly up at its inception in order to hold the members 12 in alinement with each other. By this means a puncture-proof joining of the protecting plate is formed, and one which cannot easily be forced sidewise or out of alinement. Thus it will be seen from the foregoing that I have perfected a puncture and rot-proof tire and one free from excessive expense in upkeep, as the outer casing has no pressure to carry, and can be used as long as it will hold together.

While this is the present and preferred construction of my invention, still in practice such deviations from said construction may be made as do not depart from the spirit of the invention.

What I claim as new and useful and deside to secure by Letters Patent is:

1. In a tire of the character described, a substantial air tight inner tube, a valve leading to said tube, curved rubber reinforcements on the outside of said tube and below the center thereof, a curved sheet metal protector around the outer perimeter of said tube, beaded edges on said protector, reinforcing wires running through said turned up edges, a layer of rubber vulcanized to the outer surface of said protector hard rubber blocks spaced apart and vulcanized to said rubber layer, an overlapping tongue on one end of said protector, sockets in one of the ends of said protector to receive projecting wires on the other end of said protector, segments enveloping and impinging against said block, turned up edges, and reinforcements on said tube as set forth.

2. In a pneumatic tire, an inner tube, a sheet metal protector around the outer perimeter of said tube, rubber blocks suitably spaced and vulcanized to said protector, a segmental outer casing enveloping said structure, an air space between said casing and said tube and non-air tight joinings between said segments of said casing as and for the purpose set forth.

In testimony whereof I affix my signature in presence of two witnesses.

ANDREW WILLIAM LIVINGSTON.

Witnesses:
FRANK H. CARTER,
W. A. STORK.